(12) United States Patent
Zhou et al.

(10) Patent No.: US 12,062,798 B2
(45) Date of Patent: *Aug. 13, 2024

(54) POWER BATTERY AND BATTERY MODULE (71) Applicant: Contemporary Amperex Technology Co., Limited, Ningde (CN)

(72) Inventors: Yong Zhou, Ningde (CN); Zhijun Guo, Ningde (CN); Peng Wang, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/954,358

(22) Filed: Sep. 28, 2022

(65) Prior Publication Data

US 2023/0019890 A1 Jan. 19, 2023

Related U.S. Application Data (63) Continuation of application No. 16/965,289, filed as application No. PCT/CN2018/083386 on Apr. 17, 2018, now Pat. No. 11,489,221.

(30) Foreign Application Priority Data

Feb. 1, 2018 (CN) .......................... 201820179736.3

(51) Int. Cl.
*H01M 50/15* (2021.01)
*H01M 10/0587* (2010.01)
(Continued)

(52) U.S. Cl.
CPC ....... *H01M 50/15* (2021.01); *H01M 10/0587* (2013.01); *H01M 50/147* (2021.01);
(Continued)

(58) Field of Classification Search
CPC ........ H01M 10/0431; H01M 10/0587; H01M 10/103; H01M 10/3425
See application file for complete search history.

(56) References Cited

U.S. PATENT DOCUMENTS

| 2002/0039679 A1 | 4/2002 | Akita et al. |
| 2006/0117701 A1 | 6/2006 | Kajimura |

(Continued)

FOREIGN PATENT DOCUMENTS

| CN | 201340879 Y | 11/2009 |
| CN | 101651187 A | 2/2010 |

(Continued)

OTHER PUBLICATIONS

Machine Translation of Liu (Year: 2010).*

(Continued)

*Primary Examiner* — Matthew T Martin
*Assistant Examiner* — Ankith R Sripathi
(74) *Attorney, Agent, or Firm* — East IP P.C.

(57) ABSTRACT

The disclosure relates to a power battery and a battery module. The power battery includes: a case including an opening; a first cap assembly covering the opening and including a liquid injection hole, and an electrode assembly disposed in the case. An end of the electrode assembly extending out of a tab is disposed opposite to the first cap assembly. The liquid injection hole includes a first inlet and a first outlet, the first cap assembly includes a first blocking member, the first blocking member is disposed between the first outlet and the electrode assembly, and the first blocking member at least partially blocks the first outlet

19 Claims, 4 Drawing Sheets

(51) Int. Cl.
  *H01M 50/147* (2021.01)
  *H01M 50/342* (2021.01)
  *H01M 50/60* (2021.01)
  *H01M 50/627* (2021.01)
(52) U.S. Cl.
  CPC ....... *H01M 50/3425* (2021.01); *H01M 50/60* (2021.01); *H01M 50/627* (2021.01)

(56) References Cited

U.S. PATENT DOCUMENTS

| | | |
|---|---|---|
| 2015/0064550 A1 | 3/2015 | Kawasaki et al. |
| 2017/0098816 A1 | 4/2017 | Guen |
| 2017/0194621 A1 | 7/2017 | Moon et al. |
| 2019/0088981 A1 | 3/2019 | Chen et al. |

FOREIGN PATENT DOCUMENTS

| | | |
|---|---|---|
| CN | 103887453 A | 6/2014 |
| CN | 105679972 A | 6/2016 |
| CN | 108461700 A | 8/2018 |
| CN | 207800664 U | 8/2018 |
| EP | 0771040 A2 | 5/1997 |
| EP | 1659649 A1 | 5/2006 |
| JP | 2010086776 A | 4/2010 |
| KR | 20160074224 A | 6/2016 |

OTHER PUBLICATIONS

The International Search Report for PCT/CN2018/083386, dated Oct. 26, 2018, 14 pages.
The extended European search report for EP Application No. 18903363.2, dated Mar. 5, 2021, 8 pages.
The Non-Final Rejection for U.S. Appl. No. 16/965,289, dated Nov. 1, 2021, 64 pages.
The Final Rejection for U.S. Appl. No. 16/965,289, dated Mar. 29, 2022, 40 pages.

* cited by examiner

POWER BATTERY AND BATTERY MODULE

CROSS-REFERENCE TO RELATED APPLICATION

This application is a continuation of U.S. patent application Ser. No. 16/965,289, filed on Jul. 27, 2020, which is a national phase of the International Application No. PCT/CN2018/083386, filed on Apr. 17, 2018. The International Application claims priority to the Chinese patent application No. 201820179736.3, filed on Feb. 1, 2018. The aforementioned patent applications are hereby incorporated by reference in their entireties.

FIELD

The disclosure relates to the technical field of power battery, and in particular to a power battery and a battery module.

BACKGROUND

The power battery generally includes an electrode assembly, a case, and a cap assembly. The electrode assembly is formed by winding a positive electrode sheet, a negative electrode sheet, and a separator disposed between the positive electrode sheet and the negative electrode sheet around a winding axis. The electrode assembly is accommodated in the case, and the cap assembly is assembled together with the case and is disposed corresponding to an end of the electrode assembly along the winding axis. The cap assembly includes a cap plate and an electrode terminal disposed in the cap plate, and herein a tab of the electrode assembly is electrically connected to the electrode terminal of the cap assembly. The cap plate includes a liquid injection hole communicating with a closed space.

SUMMARY

Embodiments of the disclosure provide a power battery and a battery module. The power battery protects the end of the electrode assembly during the liquid injection, and reduces a probability that a short circuit occurs between a positive electrode sheet and a negative electrode sheet.

In one aspect, embodiments of the disclosure provide a power battery, including: a case including two openings opposite to each other; an electrode assembly which is formed by winding a positive electrode sheet, a negative electrode sheet, and a separator disposed between the positive electrode sheet and the negative electrode sheet around a winding axis, the electrode assembly being disposed in the case, and two opposite ends of the electrode assembly along the winding axis being respectively disposed corresponding to the two openings; a first cap assembly covering one of the two openings, the first cap assembly including an liquid injection hole communicating with an interior of the case; a second cap assembly covering the other of the two openings, the second cap assembly including a through hole communicating with the interior of the case; in a length direction, the liquid injection hole and the through hole are located on a same side of a central axis of the case.

In another aspect, embodiments of the disclosure provide a battery module including a plurality of power batteries as described above.

BRIEF DESCRIPTION OF THE DRAWINGS

In order to more clearly illustrate the technical solutions of the embodiments of the disclosure, the drawings used in the embodiments of the disclosure will be briefly described below; it is obvious that the drawings described below are only some embodiments of the disclosure; and for those skilled in the art, other drawings can be obtained according to the drawings without any creative work.

The views are not necessarily plotted in actual proportion in the drawings.

REFERENCE SIGNS IN THE DRAWINGS 1 case;
1a central axis of case;
electrode assembly;
21 tab;
3 first cap assembly;
31 liquid injection hole;
31a first inlet;
31b first outlet;
32 first cap plate;
33 first vent film;
33a axis;
34 first electrode terminal;
35 first blocking member;
36 first guide channel;
4 second electrode terminal;
41 through hole;
41a second inlet;
41b second outlet;
42 second cap plate;
43 second vent film;
43a axis;
44 second electrode terminal;
45 second blocking member;
46 second guide channel;
X length direction;
Y height direction.

DETAILED DESCRIPTION

Below, embodiments of the disclosure will be further described in detail with reference to the drawings and embodiments. The detailed description according to the embodiments and the accompanying drawings below are intended to exemplary illustrate the principles of the disclosure and are not intended to limit the scope of the disclosure, i.e., the disclosure is not limited to the described embodiments and the scope of the disclosed is defined by the claims.

In the description of the disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", and the like are configured for descriptive purposes only and are not to be construed as indicating or implying relative importance.

In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

Since a liquid injection hole in a cap plate of a power battery is usually disposed facing an end of an electrode assembly along a winding axis, when an axis of the liquid injection hole is in a vertical direction, an electrolyte that is injected into a case through the liquid injection hole will flow in the vertical direction (in order to improve the efficiency of electrolyte injection, it is often necessary to increase the injection pressure of the electrolyte), such that the electrolyte will impact the end of the electrode assembly along the winding axis. At this time, due to the excessive impact force of the electrolyte, a separator between a positive electrode sheet and a negative electrode sheet at the end position will be deformed and displaced, which will cause the positive electrode sheet and the negative electrode sheet to contact each other and cause a short circuit.

For better understanding of the disclosure, power batteries according to embodiments of the disclosure will be described below in detail with reference to FIGS. 1 to 4.

Figure 1:
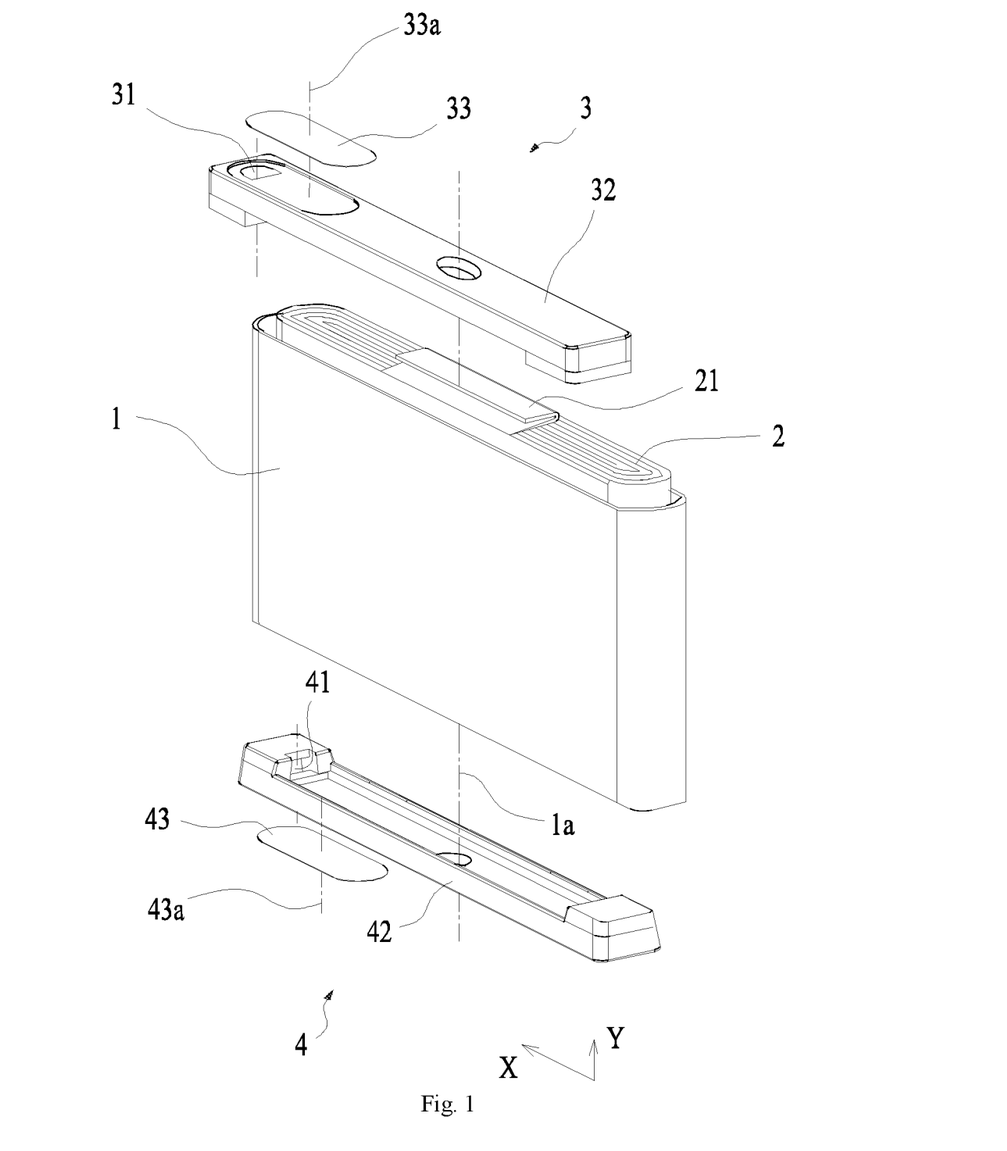
FIG. 1 is an exploded structural view of a power battery according to an embodiment of the disclosure.
Figure 2:
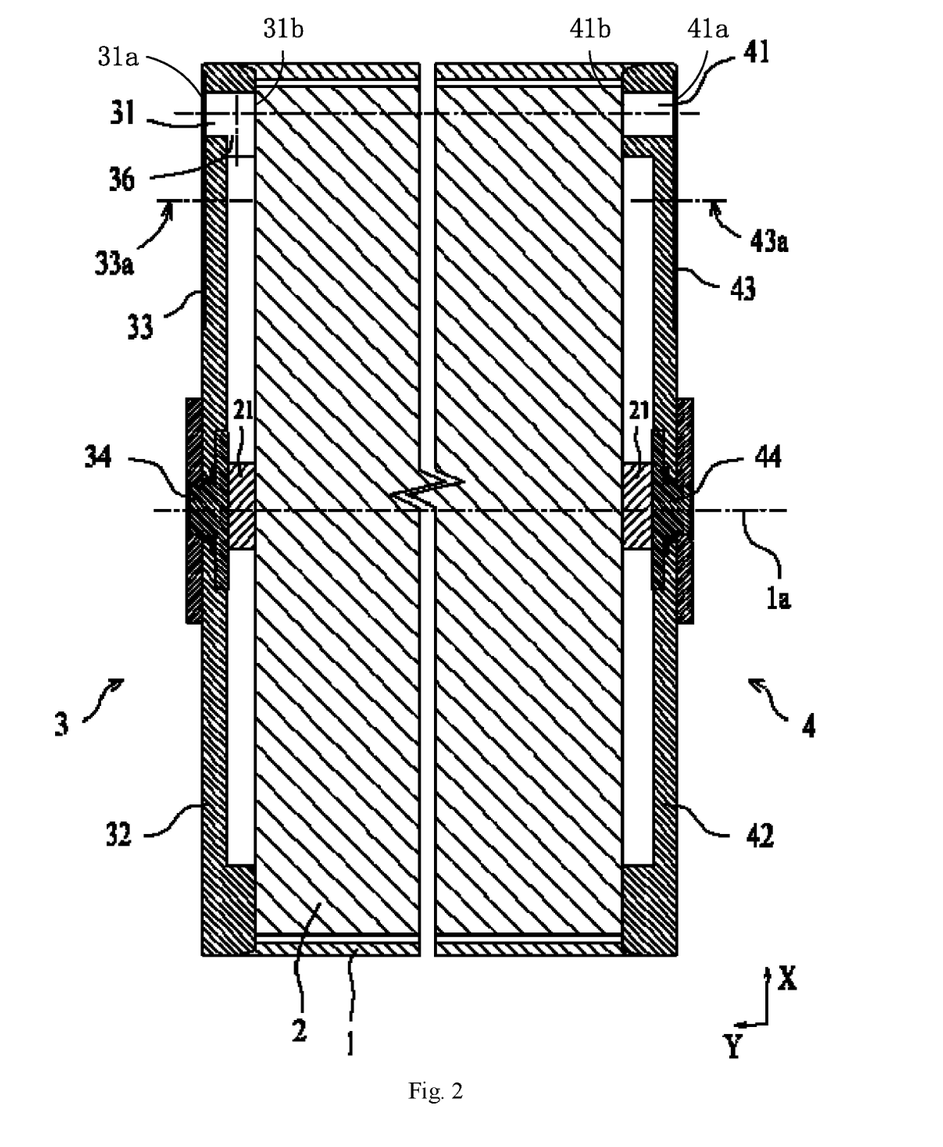
FIG. 2 is a structural sectional view of a power battery according to a first embodiment of the disclosure.
Figure 3:
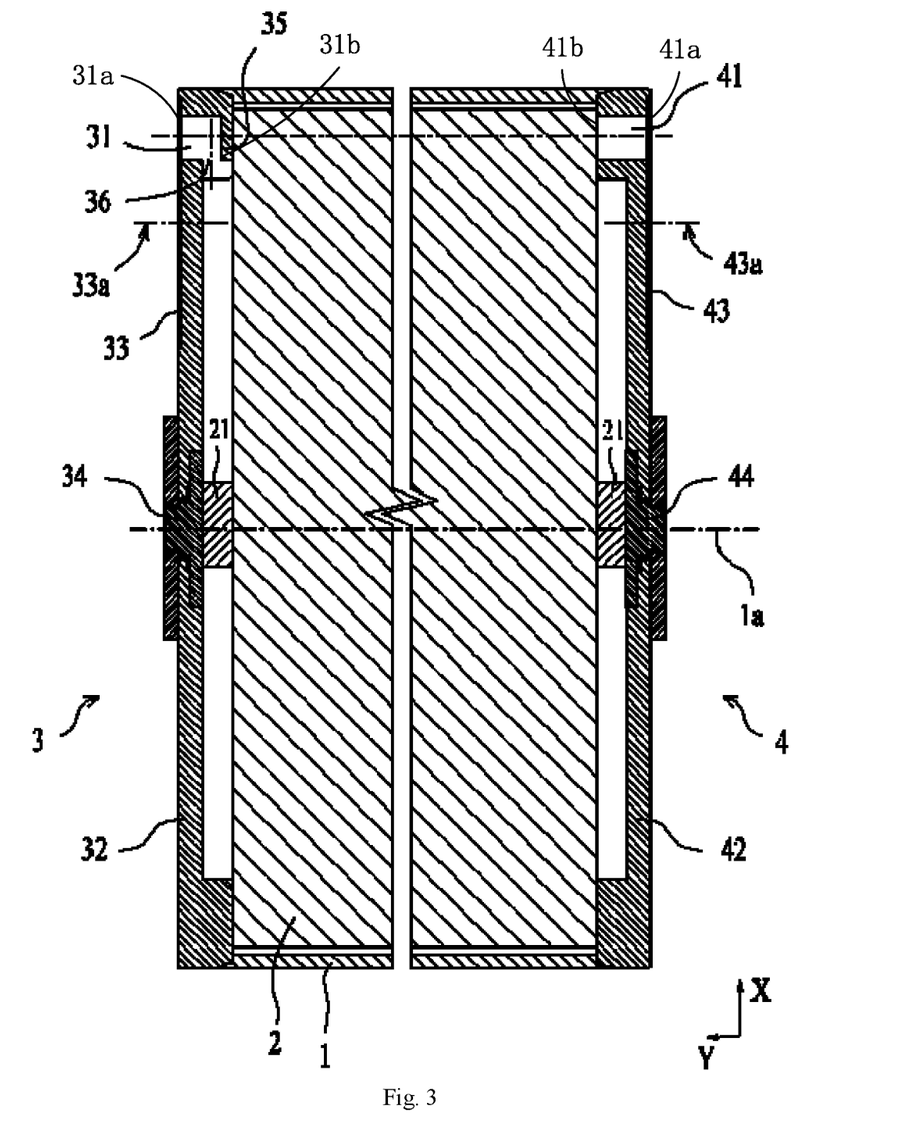
FIG. 3 is a structural sectional view of a power battery according to a second embodiment of the disclosure.
Figure 4:
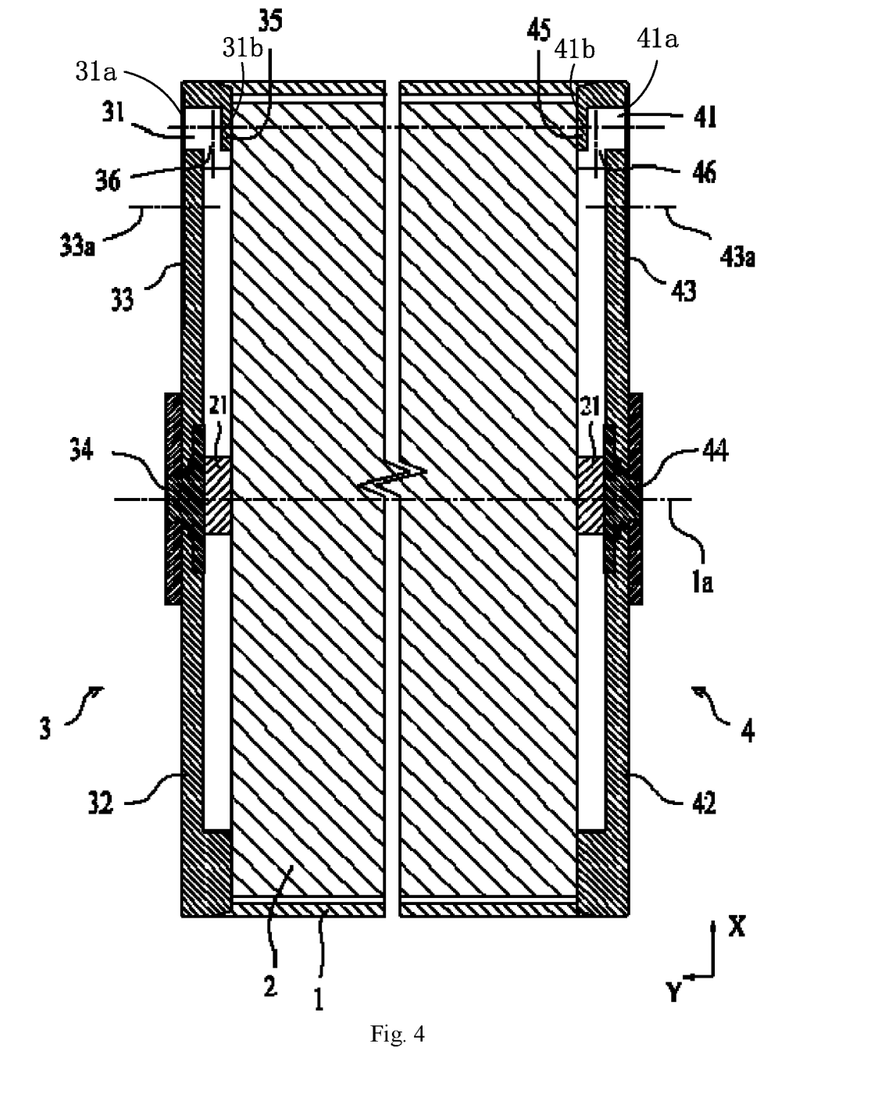
FIG. 4 is a structural sectional view of a power battery according to a third embodiment of the disclosure.

FIG. 1 schematically shows an exploded structure of a power battery according to an embodiment of the disclosure. FIG. 2 schematically shows a cross-sectional structure of a power battery according to a first embodiment of the disclosure. FIG. 3 schematically shows a cross-sectional structure of a power battery according to a second embodiment of the disclosure. FIG. 4 schematically shows a cross-sectional structure of a power battery according to a third embodiment of the disclosure.

As shown in FIG. 1, the power battery according to the embodiment of the disclosure includes a case 1, an electrode assembly 2 disposed in the case 1, and a first cap assembly 3 and a second cap assembly 4 both connected to the case 1. The case 1 includes two openings. The electrode assembly 2 is formed by winding a positive electrode sheet, a negative electrode sheet, and a separator disposed between the positive electrode sheet and the negative electrode sheet around a winding axis. The electrode assembly 2 includes two opposite ends along the winding axis. After the positive electrode sheet, the negative electrode sheet, and the separator disposed between the positive electrode sheet and the negative electrode sheet are wound, a spiral winding is formed at each end. The electrode assembly 2 is disposed in the case 1, and the two opposite ends of the electrode assembly 2 along the winding axis are respectively disposed corresponding to the two openings. The first cap assembly 3 covers one of the openings, and the second cap assembly 4 covers the other opening.

The placement position of the first cap assembly 3 shown in FIG. 1 is taken as an object, an overall height direction of the first cap assembly 3 is taken as a height direction Y, an overall length direction of the first cap assembly 3 is taken as a length direction X, and a direction perpendicular to both the height direction Y and the length direction X is taken as a width direction (not marked in the drawings). The height direction Y is a thickness direction of the first cap assembly 3.

The first cap assembly 3 according to the embodiment includes a liquid injection hole 31 communicating with an interior of the case 1. The second cap assembly 4 includes a through hole 41 communicating with the interior of the case 1. In the length direction X, the liquid injection hole 31 of the first cap assembly 3 and the through hole 41 of the second cap assembly 4 are located on a same side of a central axis 1a of the case 1. The central axis 1a of the case 1 refers to a central axis of the case 1 along the height direction Y. Two portions of the case 1 at two respective sides of the central axis 1a are substantially symmetrical with respect to the central axis 1a. On one hand, when the power battery needs to be filled with liquid, the power battery can be placed horizontally (as shown in FIGS. 2 to 4), i.e., the first cap assembly 3 is in a vertical state, and then the liquid injection operation is performed. The liquid injection hole 31 disposed in the first cap assembly 3 is at a high position, and an electrolyte injected into the case 1 through the liquid injection hole 31 will flow along a parabolic trajectory due to its own gravity, which thereby effectively reduces a horizontal impact force on the end of the electrode assembly 2 and reduces a probability that a short circuit occurs between the positive electrode sheet and the negative electrode sheet due to insulation failure which may be caused by the displacement of the separator under the impact of the electrolyte. In another aspect, since the liquid injection hole 31 in the first cap assembly 3 and the through hole 41 in the second cap assembly 4 are located on the same side of the central axis 1a of the case 1, gas inside the case 1 can be discharged from the power battery through the through hole 41 when the liquid is injected through the liquid injection hole 31, which facilitates quick liquid injection. On the other hand, since the liquid injection hole 31 in the first cap assembly 3 and the through hole 41 in the second cap assembly 4 are located on the same side of the central axis 1a of the case 1, it is ensured that the electrolyte will not overflow from the through hole 41 when the liquid is injected through the liquid injection hole 31, and it is ensured that enough electrolyte will be injected. In still another aspect, the electrolyte may be injected into the case 1 through both the liquid injection hole 31 and the through hole 41 at the same time, which improves the efficiency of liquid injection. When it is necessary to inject the liquid through the through hole 41, the through hole 41 disposed in the second cap assembly 4 is also at a high position, and the electrolyte discharged from the through hole 41 will flow along a parabolic trajectory due to its own gravity, which thereby effectively reduces a horizontal impact force on the end of the electrode assembly 2 and reduces a probability that a short circuit occurs between the positive electrode sheet and the negative electrode sheet due to insulation failure which may be caused by the displacement of the separator under the impact of the electrolyte.

According to the embodiment, a projection of the liquid injection hole 31 in the height direction Y at least partially overlaps with a projection of the through hole 41 in the height direction Y. When the liquid injection operation of the power battery is performed, the liquid injection hole 31 and the through hole 41 may be approximately in the same horizontal position with each other, which helps to increase the liquid injection amount of the power battery.

In one embodiment, an axis of the liquid injection hole 31 coincides with an axis of the through hole 41, which can further increase the liquid injection amount of the power battery. Optionally, a shape of the liquid injection hole 31 is the same as a shape of the through hole 41, which reduces the difficulty of manufacturing.

The liquid injection hole 31 according to the embodiment is disposed at an end of the first cap assembly 3 along the length direction X. The through hole 41 is disposed at an end of the second cap assembly 4 along the length direction X. In this way, more electrolyte can be further injected into the case 1.

For the power battery according to embodiments of the disclosure, when the power battery is filled with liquid, since an electrolyte injected into the case will flow along a parabolic trajectory due to its own gravity and does not vertically impact the end of the electrode assembly, the impact force on the end of the electrode assembly will be reduced, which thereby reduces a probability that a short circuit occurs between the positive electrode sheet and the negative electrode sheet which may be caused by the displacement of the separator included in the electrode assembly under the impact of the electrolyte, improves a yield of the power battery after the liquid injection operation is finished, and also eliminates hidden dangers of the power battery and ensures the safety in the subsequent use.

The technical solution will be further described clearly below with reference to specific embodiments, but the following embodiments do not limit the protection scope of the disclosure.

First Embodiment

As shown in FIG. 2, the first cap assembly 3 according to the embodiment includes a first cap plate 32 and a first electrode terminal 34 disposed in the first cap plate 32. Taps 21 are disposed at two opposite ends of the electrode assembly 2 respectively. The first cap plate 32 is connected to the case 1. The first electrode terminal 34 is electrically connected to one tab 21 on the electrode assembly 2. The liquid injection hole 31 is disposed in the first cap plate 32. The first cap plate 32 includes a top and a bottom opposite to each other in the height direction Y (the top and the bottom are based on the placement position as shown in FIG. 1). The liquid injection hole 31 includes a first inlet 31a disposed at the top of the first cap plate 32 and a first outlet 31b disposed at the bottom of the first cap plate 32. The second cap assembly 4 according to the embodiment includes a second cap plate 42 and a second electrode terminal 44 disposed on the second cap plate 42. The second cap plate 42 is connected to the case 1. The second electrode terminal 44 is electrically connected to the other tab 21 on the electrode assembly 2. The through hole 41 is disposed in the second cap plate 42. The second cap plate 42 includes a top and a bottom opposite to each other in the height direction Y (the top and the bottom are based on the placement position as shown in FIG. 1). The through hole 41 includes a second inlet 41a disposed at the top of the second cap plate 42 and a second outlet 41b disposed at the bottom of the second cap plate 42.

FIG. 2 schematically shows that the power battery is in a to-be-injected state. In one example, the electrolyte is injected from the first inlet 31a of the liquid injection hole 31 and enters the case 1 from the first outlet 31b. The electrolyte discharged from the first outlet 31b will flow along a parabolic trajectory due to its own gravity, which thereby effectively reduces a horizontal impact force on the end of the electrode assembly 2. When the electrolyte is injected into the case 1 through the liquid injection hole 31, the through hole 41 can serve as an exhaust passage, and gas in the case 1 can be discharged through the through hole 41. In another example, the electrolyte may be injected from both the first inlet 31a of the liquid injection hole 31 and the second inlet 41a of the through hole 41 at the same time, which improves the efficiency of liquid injection.

In some embodiments, the liquid injection hole 31 is disposed at an end of the first cap plate 32 along the length direction X. The through hole 41 is disposed at an end of the second cap plate 42 along the length direction X. A projection of the liquid injection hole 31 in the height direction Y completely overlaps with a projection of the through hole 41 in the height direction Y. In this way, the injection amount of the electrolyte can be further increased.

The first cap assembly 3 according to the embodiment includes a first vent film 33. The first vent film 33 is disposed on the top of the first cap plate 32. After the liquid injection operation is finished, an edge of the first vent film 33 and the top of the first cap plate 32 form an annular joint, such that the first vent film 33 and the first cap plate 32 are hermetically connected. The first vent film 33 covers the first inlet 31a of the liquid injection hole 31. After the electrolyte injection operation through the liquid injection hole 31 is finished, the first vent film 33 is hermetically connected to the top of the first cap plate 32, and the through hole 41 is also blocked to ensure that the interior of the power battery is in a sealed state. When the pressure inside the power battery is greater than a design pressure of the first vent film 33, the first vent film 33 will be broken, which thereby releases the internal pressure of the power battery and ensures the safety of the power battery.

Optionally, the first vent film 33 according to the embodiment may have a strip-shaped structure or a circle-shaped structure.

An axis of the first inlet 31a of the liquid injection hole 31 according to the embodiment is arranged offset from an axis 33a of the first vent film 33, and the axis 33a of the first vent film 33 is closer than the axis of the first inlet 31a to the central axis 1a of the case 1. The axis 33a of the first vent film 33 refers to a central axis of the first vent film 33 along the height direction Y, and the first vent film 33 is substantially symmetrical with respect to the axis 33a. In this way, on one hand, it is beneficial to increase a force-bearing area of the first vent film 33; and on the other hand, a diameter of the liquid injection hole 31 can be made small, thus when the liquid is injected from the liquid injection hole 31, more electrolyte can be injected into the case 1 and it can be effectively prevented that the electrolyte overflows from the liquid injection hole 31. A surface area of the first vent film 33 located within the annular joint is the effective force-bearing area of the first vent film 33. The gas discharged from the liquid injection hole 31 can apply a compressive force on the surface of the first vent film 33 located within the annular joint. A cross-sectional area of the liquid injection hole 31 refers to a projected area of the liquid injection hole 31 along the height direction Y. The larger the surface area of the first vent film 33 located within the annular joint, the lower the pressure required for its breaking. According to product requirements, the first vent film 33 is selected to have a suitable size to effectively ensure the safety of the power battery.

The top of the first cap plate 32 according to the embodiment includes a concave portion that is recessed toward the bottom. The liquid injection hole 31 is in communication with the recess, and the first vent film 33 is accommodated in the recess. The concave portion disposed at the top of the first cap plate 32 can position the first vent film 33 so as to quickly install and fix the first vent film 33 at a predetermined position on the first cap plate 32. Also, it is convenient to weld the joint formed between the first vent film 33 and the first cap plate 32, and it is beneficial to realize a quick connection between the first vent film 33 and the first cap plate 32. Furthermore, it can be avoided that the first vent film 33 disposed increases a thickness of the first cap plate 32.

The second cap assembly 4 according to the embodiment includes a second vent film 43. The second vent film 43 is disposed on the top of the second cap plate 42. After the liquid injection operation is finished, an edge of the second vent film 43 and the top of the second cap plate 42 form an annular joint, such that the second vent film 43 and the second cap plate 42 are hermetically connected. The second vent film 43 covers the second inlet 41a of the through hole 41. After the electrolyte injection operation is finished, the second vent film 43 is hermetically connected to the top of the second cap plate 42 to seal the through hole 41 so as to ensure that the interior of the power battery is in a sealed state. When the pressure inside the power battery is greater than a design pressure of the second vent film 43, the second vent film 43 will be broken, which thereby releases the internal pressure of the power battery and ensures the safety of the power battery.

Optionally, the second vent film 43 according to the embodiment may have a strip shape or a circular shape.

Optionally, an axis of the second inlet 41a of the through hole 41 according to the embodiment is arranged offset from an axis 43a of the second vent film 43, and the axis 43a of the second vent film 43 is closer than the axis of the second inlet 41a to the central axis 1a of the case 1. The axis 43a of the second vent film 43 refers to a central axis of the second vent film 43 along the height direction Y, and the second vent film 43 is substantially symmetrical with respect to the axis 33a. In this way, on one hand, it is beneficial to increase a force-bearing area of the second vent film 43; and on the other hand, when the liquid is injected from the through hole 41, more electrolyte can be injected into the case 1 and it can be effectively prevented that the electrolyte reversely overflows from the through hole 41.

A surface area of the second vent film 43 located within the annular joint is the effective force-bearing area of the second vent film 43. The gas discharged from the through hole 41 can apply a compressive force on the surface of the second vent film 43 located within the annular joint. A cross-sectional area of the through hole 41 refers to a projected area of the through hole 41 along the height direction Y. The larger the surface area of the second vent film 43 located within the annular joint, the lower the pressure required for its breaking. According to product requirements, the second vent film 43 is selected to have a suitable size to effectively ensure the safety of the power battery.

The top of the second cap plate 42 according to the embodiment includes a concave portion that is recessed toward the bottom. The through hole 41 is in communication with the recess, and the second vent film 43 is accommodated in the recess. The concave portion disposed at the top of the second cap plate 42 can position the second vent film 43 so as to quickly install and fix the second vent film 43 at a predetermined position on the second cap plate 42. Also, it is convenient to weld the joint formed between the second vent film 43 and the second cap plate 42, and it is beneficial to realize a quick connection between the second vent film 43 and the second cap plate 42. Furthermore, it can be avoided that the second vent film 43 disposed increases a thickness of the second cap plate 42.

Second Embodiment

In the first embodiment, a case where the liquid injection hole 31 is disposed in the first cap assembly 3 and the through hole 41 is disposed is the second cap assembly 4 has been described. In this embodiment, description mainly focuses on differences from the first embodiment, and the same structure will not be repeated in this embodiment.

FIG. 3 shows that the power battery is in a to-be-injected state. As shown in FIG. 3, the first cap assembly 3 according to the embodiment includes a first blocking member 35. The first blocking member 35 is disposed between the first outlet 31b of the liquid injection hole 31 and the electrode assembly 2, and a projection of the first blocking member 35 in the height direction Y at least partially blocks the first outlet 31b. In this way, when the liquid injection hole 31 is used for liquid injection of the power battery, since the electrolyte injected from the liquid injection hole 31 is blocked by the first blocking member 35, a flow rate of the electrolyte injected at a high pressure will be slowed, and the impact force on the end of the electrode assembly 2 will be reduced. Thereby, it reduces a probability that a short circuit occurs between the positive electrode sheet and the negative electrode sheet which may be caused by the displacement of the separator included in the electrode assembly 2 under the impact of the electrolyte, improves a yield of the power battery after the liquid injection operation is finished, and also eliminates hidden dangers of the power battery and ensures the safety in the subsequent use.

In some embodiments, the projection of the first blocking member 35 in the height direction Y completely blocks the first outlet 31b of the liquid injection hole 31, such that all the electrolyte discharged from the first outlet 31b of the liquid injection hole 31 has to turn a predetermined angle before entering the case 1, which further effectively prevents the electrolyte from impacting the end of the electrode assembly 2.

Optionally, the liquid injection hole 31 is disposed at the end of the first cap plate 32 along the length direction X. A first guide channel 36 is formed between the first blocking member 35 and the first cap plate 32. The first guide channel 36 communicates with the first outlet 31b of the liquid injection hole 31. An outlet of the first guide channel 36 is oriented towards the central axis 1a of the case 1. The first guide channel 36 and the liquid injection hole 31 are at a predetermined angle. The electrolyte injected from the first inlet 31a of the liquid injection hole 31 flows to the outlet of the liquid injection hole 31 along the height direction Y, and turns a predetermined angle due to obstruction of the first blocking member 35, and then is discharged through the first guide channel 36, such that the electrolyte will not continue to flow in the height direction Y when it is discharged from the first outlet 31b of the liquid injection hole 31, and thus the flow rate of the electrolyte injected at high pressure will be slowed and the resultant impact force on the end of the electrode assembly 2 will be reduced.

Optionally, the predetermined angle formed between the first guide channel 36 and the liquid injection hole 31 is 90°, such that the electrolyte is injected into the liquid injection hole 31 along the height direction Y and discharged from the first guide channel 36 along the length direction X, which reduces the impact force of the electrolyte on the electrode assembly 2 along the height direction Y.

Optionally, the first blocking member 35 and the first cap plate 32 according to the embodiment have an integrated structure, which improves a connection strength of them, and also facilitates one-time manufacturing, reducing manufacturing procedures and manufacturing difficulties.

Optionally, the first blocking member 35 according to the embodiment has a plate-shaped structure.

Third Embodiment

In the second embodiment, a case where the first blocking member 35 is further disposed in the first cap assembly 3 has been described. In this embodiment, description mainly focuses on differences from the second embodiment, and the same structure will not be repeated in this embodiment.

FIG. 4 shows that the power battery is in a to-be-injected state. As shown in FIG. 4, the second cap assembly 4 according to the embodiment includes a second blocking member 45. The second blocking member 45 is disposed between the second outlet 41b of the through hole 41 and the electrode assembly 2, and a projection of the second blocking member 45 in the height direction Y at least partially blocks the second outlet 41b. In this way, when the through hole 41 is used for liquid injection of the power battery, since the electrolyte injected from the through hole 41 is blocked by the second blocking member 45, a flow rate of the electrolyte injected at a high pressure will be slowed, and the impact force on the end of the electrode assembly 2 will be reduced, which thereby reduces a probability that a short circuit occurs between the positive electrode sheet and the negative electrode sheet which may be caused by the displacement of the separator included in the electrode assembly 2 under the impact of the electrolyte, improves a yield of the power battery after the liquid injection operation is finished, and also eliminates hidden dangers of the power battery and ensures the safety in the subsequent use.

In some embodiments, the projection of the second blocking member 45 in the height direction Y completely blocks the second outlet 41b of the through hole 41, such that all the electrolyte discharged from the second outlet 41b of the through hole 41 has to turn a predetermined angle before entering the case 1, which further effectively prevents the electrolyte from impacting the end of the electrode assembly 2.

Optionally, the through hole 41 is disposed at the end of the second cap plate 42 along the length direction X. A second guide channel 46 is formed between the second blocking member 45 and the second cap plate 42. The second guide channel 46 communicates with the second outlet 41b of the through hole 41. An outlet of the second guide channel 46 is oriented towards the central axis 1a of the case 1. The second guide channel 46 and the through hole 41 are at a predetermined angle. The electrolyte injected from the second inlet 41a of the through hole 41 flows to the outlet of the through hole 41 along the height direction Y, and turns a predetermined angle due to obstruction of the second blocking member 45, and then is discharged through the second guide channel 46, such that the electrolyte will not continue to flow in the height direction Y when it is discharged from the second outlet 41b of the through hole 41, and thus the flow rate of the electrolyte injected at high pressure will be slowed and the resultant impact force on the end of the electrode assembly 2 will be reduced.

Optionally, the predetermined angle formed between the second guide channel 46 and the through hole 41 is 90°, such that the electrolyte is injected into the through hole 41 along the height direction Y and discharged from the second guide channel 46 along the length direction X, which reduces the impact force of the electrolyte on the electrode assembly 2 along the height direction Y.

Optionally, the second blocking member 45 and the second cap plate 42 according to the embodiment have an integrated structure, which improves a connection strength of them, and also facilitates one-time manufacturing, reducing manufacturing procedures and manufacturing difficulties.

Optionally, the second blocking member 45 according to the embodiment has a plate-shaped structure.

For the power battery according to embodiments of the disclosure, when the power battery is filled with liquid, since the electrolyte injected into the case 1 does not vertically impact the end of the electrode assembly 2, the impact force on the end of the electrode assembly 2 will be reduced, which thereby reduces a probability that a short circuit occurs between the positive electrode sheet and the negative electrode sheet which may be caused by the displacement of the separator included in the electrode assembly 2 under the impact of the electrolyte, improves a yield of the power battery after the liquid injection operation is finished, and also eliminates hidden dangers of the power battery and ensures the safety in the subsequent use.

An embodiment of the disclosure also provides a battery module. The battery module according to the embodiment includes a plurality of power batteries according to the above embodiments. The power batteries are arranged side by side in one direction. Since the power battery according to the embodiment has good safety performance, it can be ensured that the battery module as a whole has good safety performance.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but includes all technical solutions falling within the scope of the claims.

What is claimed is:

1. A power battery, wherein the power battery comprises:
a case comprising an opening;
a first cap assembly covering the opening and comprising a liquid injection hole, and
an electrode assembly disposed in the case, wherein an end of the electrode assembly extending out of a tab is disposed opposite to the first cap assembly;
wherein the liquid injection hole comprises a first inlet and a first outlet, the first cap assembly comprises a first blocking member, the first blocking member is disposed between the first outlet and the electrode assembly, and the first blocking member at least partially blocks the first outlet;
the first cap assembly comprises a first cap plate, the liquid injection hole is disposed at the first cap plate, a first guide channel is formed between the first blocking member and the first cap plate, the first guide channel communicates with the first outlet, and an outlet of the first guide channel is oriented towards the central axis of the case in a length direction.

2. The power battery according to claim 1, wherein the first blocking member completely blocks the first outlet of the liquid injection hole.

3. The power battery according to claim 1, wherein the first blocking member and the first cap plate have an integrated structure.

4. The power battery according to claim 1, wherein
the case comprises two openings opposite to each other,
the power battery further comprises a second cap assembly covering the other of the two openings, the second cap assembly comprises a through hole communicating with the interior of the case.

5. The power battery according to claim 4, wherein in a length direction, the liquid injection hole and the through hole are located on a same side of a central axis of the case.

6. The power battery according to claim 5, wherein a projection of the liquid injection hole in a thickness direction of the first cap assembly at least partially overlaps with a projection of the through hole in the thickness direction of the first cap assembly.

7. The power battery according to claim 6, wherein an axis of the liquid injection hole coincides with an axis of the through hole.

8. The power battery according to claim 6, wherein the liquid injection hole is disposed at an end of the first cap assembly along the length direction, and the through hole is disposed at an end of the second cap assembly along the length direction.

9. The power battery according to claim 4, wherein
the through hole comprises a second inlet and a second outlet, the second cap assembly comprises a second blocking member, the second blocking member is disposed between the second outlet and the electrode assembly, and the second blocking member at least partially blocks the second outlet.

10. The power battery according to claim 9, wherein
the second cap assembly comprises a second cap plate, the through hole and the second blocking member are disposed at the second cap plate, a second guide channel is formed between the second blocking member and the second cap plate, the second guide channel communicates with the second outlet, and an outlet of the second guide channel is oriented towards the central axis of the case.

11. The power battery according to claim 1, wherein the first cap assembly comprises a first vent film, and the first vent film covers a first inlet of the liquid injection hole; an axis of the first inlet is arranged offset from an axis of the first vent film, and the axis of the first vent film is closer than the axis of the first inlet to the central axis of the case.

12. The power battery according to claim 11, wherein the first vent film is disposed on a top of the first cap plate.

13. The power battery according to claim 12, wherein the top of the first cap plate comprises a concave portion that is recessed toward a bottom of the first cap plate, the liquid injection hole is in communication with the recess, and the first vent film is accommodated in the recess.

14. The power battery according to claim 11, wherein the first vent film has a strip-shaped structure or a circle-shaped structure.

15. The power battery according to claim 10, wherein the second cap assembly comprises a second vent film, and the second vent film covers a second inlet of the through hole; an axis of the second inlet is arranged offset from an axis of the second vent film, and the axis of the second vent film is closer than the axis of the second inlet to the central axis of the case.

16. The power battery according to claim 15, wherein the second vent film is disposed on a top of the second cap plate.

17. The power battery according to claim 16, wherein the top of the second cap plate comprises a concave portion that is recessed toward a bottom of the second cap plate, the through hole is in communication with the recess, and the second vent film is accommodated in the recess.

18. The power battery according to claim 1, wherein the electrode assembly is formed by winding a positive electrode sheet, a negative electrode sheet, and a separator disposed between the positive electrode sheet and the negative electrode sheet around a winding axis, and the end of the electrode assembly along the winding axis is disposed opposite to the opening.

19. A battery module, wherein the battery module comprises a plurality of power batteries, and each power battery comprises:
a case comprising an opening;
a first cap assembly covering the opening and comprising a liquid injection hole, and
an electrode assembly disposed in the case, wherein an end of the electrode assembly extending out of a tab is disposed opposite to the first cap assembly;
wherein the liquid injection hole comprises a first inlet and a first outlet, the first cap assembly comprises a first blocking member, the first blocking member is disposed between the first outlet and the electrode assembly, and the first blocking member at least partially blocks the first outlet;
the first cap assembly comprises a first cap plate, the liquid injection hole is disposed at the first cap plate, a first guide channel is formed between the first blocking member and the first cap plate, the first guide channel communicates with the first outlet, and an outlet of the first guide channel is oriented towards the central axis of the case in a length direction.

* * * * *